(12) United States Patent
Vuppula et al.

(10) Patent No.: US 12,528,997 B2
(45) Date of Patent: Jan. 20, 2026

(54) CONVERSION OF GAS CONDENSATE TO VALUE ADDED PETROCHEMICALS IN AN INTEGRATED REACTOR PROCESS

(71) Applicants: SABIC Global Technologies B.V., Bergen Op Zoom (NL); Saudi Arabian Oil Company, Dhahran (SA)

(72) Inventors: Rajitha Vuppula, Bengaluru (IN); Vidya Sagar Guggilla, Bengaluru (IN); Tjeerd Alexander Nijhuis, Galeen (NL); Venkata Sunil Jagani, Bengaluru (IN); Gopal Juttu, Dhahran (SA)

(73) Assignees: Saudi Arabian Oil Company, Dhahran (SA); SABIC Global Technologies B.V., Bergen op Zoom (NL)

( * ) Notice: Subject to any disclaimer, the term of this patent is extended or adjusted under 35 U.S.C. 154(b) by 143 days.

(21) Appl. No.: 18/421,129

(22) Filed: Jan. 24, 2024

(65) Prior Publication Data

US 2025/0236799 A1    Jul. 24, 2025

(51) Int. Cl.
*C10G 69/04* (2006.01)
*B01J 29/08* (2006.01)
(Continued)

(52) U.S. Cl.
CPC ............ *C10G 69/04* (2013.01); *B01J 29/088* (2013.01); *B01J 29/40* (2013.01); *B01J 29/80* (2013.01);
(Continued)

(58) Field of Classification Search
CPC ............ C10G 69/04; C10G 2300/1096; C10G 2300/202; C10G 2300/4006;
(Continued)

(56) References Cited

U.S. PATENT DOCUMENTS

| 3,617,493 A | 11/1971 | Wirth et al. |
| 5,469,369 A | 11/1995 | Muldowney |

(Continued)

FOREIGN PATENT DOCUMENTS

| WO | 2014062465 A1 | 4/2014 |
| WO | 2022072300 A1 | 4/2022 |
| WO | 2022150265 A1 | 7/2022 |

OTHER PUBLICATIONS

Notification of Transmittal of the International Search Report and the Written Opinion of the International Searching Authority, or the Declaration dated Jun. 16, 2025 pertaining to International application No. PCT/US2025/015380 filed Feb. 11, 2025, pp. 1-16.

*Primary Examiner* — Randy Boyer
*Assistant Examiner* — Juan C Valencia
(74) *Attorney, Agent, or Firm* — Dinsmore & Shohl LLP

(57) ABSTRACT

Integrated processes for upgrading a hydrocarbon condensate stream to enhanced value streams including splitting a desalted feed stream into a light cut, a middle cut, and a heavy cut. The light cut is provided to a steam cracker unit to generate a steam cracked gas stream, a C4+ hydrocarbon stream, and a C9+ hydrocarbon stream, the middle cut is provided to a first catalytic cracker unit to generate a first cracked product stream, and the heavy cut is provided to a second catalytic cracker unit to generate a second cracked product stream. The steam cracked gas stream is provided to an olefins separation unit to generate at least one light olefin stream. Other effluents from the olefins separation unit and the steam cracker unit are provided to a hydrogenation unit, an aromatic extraction unit, or recycled within the system.

20 Claims, 3 Drawing Sheets

(51) Int. Cl.
  *B01J 29/40* (2006.01)
  *B01J 29/80* (2006.01)
(52) U.S. Cl.
  CPC ............... *C10G 2300/1096* (2013.01); *C10G 2300/202* (2013.01); *C10G 2300/4006* (2013.01); *C10G 2400/20* (2013.01)
(58) Field of Classification Search
  CPC .. C10G 2400/20; C10G 5/00; C10G 2400/04; C10G 9/36; C10G 11/00; C10G 31/08; C10G 45/00; C10G 69/00; C10G 2400/30; B01J 29/088; B01J 29/40; B01J 29/80
  See application file for complete search history.

(56) References Cited

U.S. PATENT DOCUMENTS

| | | |
|---|---|---|
| 7,491,315 B2 | 2/2009 | Eng et al. |
| 7,972,498 B2 | 7/2011 | Buchanan et al. |
| 10,301,566 B2 | 5/2019 | Gunawan |
| 10,479,948 B2 | 11/2019 | Ward et al. |
| 10,717,941 B2 * | 7/2020 | Al-Ghamdi ............. C07C 29/04 |
| 11,142,711 B2 * | 10/2021 | Koseoglu ............... C10G 69/02 |
| 11,242,493 B1 | 2/2022 | Xu et al. |
| 11,332,680 B2 | 5/2022 | Al-Ghrami et al. |
| 2005/0150817 A1 | 7/2005 | Tallman et al. |
| 2021/0246386 A1 | 8/2021 | Koseoglu |
| 2022/0064548 A1 | 3/2022 | Akah et al. |

* cited by examiner

CONVERSION OF GAS CONDENSATE TO VALUE ADDED PETROCHEMICALS IN AN INTEGRATED REACTOR PROCESS

TECHNICAL FIELD

The present disclosure relates to an integrated process and associated system for conversion of hydrocarbon condensate to value added petrochemicals.

BACKGROUND

Aromatics such as BTX (benzene, toluene, and xylenes) and olefins are valuable chemicals frequently utilized in the production of many materials and formulation of many consumer goods. For example, BTX compounds are frequently utilized during the processing or production of petroleum products and during the production of consumer goods such as paints and lacquers, thinners, fuels, rubber products, adhesives, inks, cosmetics and pharmaceutical products. Similarly, light olefins are the building blocks for many modern plastic products. As such, plentiful, efficient, and economical production of both light olefins and BTX is generally desirable. Further, there is consistent demand for hydrocarbon fuels, for example diesel fuel. However, present production of such fuels is limited.

Globally the production of condensates has been steadily increasing. It is desirable to be able to leverage the increased production of condensates for production of aromatics, olefins, and hydrocarbon fuels. Such chemicals and fuels are typically manufactured by thermal cracking of Ethane, Propane, Butane and Naphtha. Ethylene produced by thermal cracking processes makes up 50% of the total ethylene production. In addition, these products also typically produced through refinery fluidized catalytic cracking (FCC) processes, where heavy feedstocks such as gas oils or residues are converted. As demands rises for these basic intermediate compounds utilizing other available feedstocks such as condensates is desirable. However, the high amounts of naphthenic and aromatic content in condensates feedstock typically amplify coke formation and fouling.

It is desirable to be able to efficiently and selectively convert hydrocarbon condensate into light olefins, BTX, and hydrocarbon fuels in view of the current and expected increasing demand for such valuable chemicals and fuels. However, existing refining systems and processes are focused on utilization of differing feed streams during production of light olefins, BTX, and hydrocarbon fuels.

SUMMARY

Accordingly, there is a clear and long-standing need to provide an efficient and economical process for the production of light olefins, BTX, and hydrocarbon fuels from a feedstock comprising substantial quantities of condensates, and more particularly natural gas condensates. The process and system of the present disclosure address this clear and long-standing need by utilizing processes and systems specifically to selectively produce light olefins, BTX, and hydrocarbon fuels from hydrocarbon condensates by optimizing the feedstock provided to each unit operation within the integrated system and consolidating redundant unit operations.

In accordance with one or more embodiments of the present disclosure, an integrated process for upgrading a hydrocarbon condensate stream to enhanced value streams is disclosed. The process includes providing a feed stream comprising the hydrocarbon condensate stream to a desalter unit to remove salt from the feed stream to generate a desalted feed stream; providing the desalted feed stream to a first separation unit to split the desalted feed stream into a light cut, a middle cut, and a heavy cut, where the light cut and the middle cut are split at a first cut temperature in the range of 90° C. to 200° C. and the middle cut and the heavy cut are split at a second cut temperature in the range of 300° C. to 360° C.; providing the light cut to a steam cracker unit to generate a steam cracked gas stream, a C4+ hydrocarbon stream, and a C9+ hydrocarbon stream, wherein the C4+ hydrocarbon stream is rich in pyrolysis gasoline; providing the middle cut to a first catalytic cracker unit with a first catalyst disposed therein to generate a first cracked product stream; providing the heavy cut to a second catalytic cracker unit with a second catalyst disposed therein to generate a second cracked product stream; providing the first cracked product stream and the second cracked product stream to a fractionation tower to generate a cracked gas fraction, a catalytic cracked naphtha fraction, a light cycle oil fraction, and a heavy cycle oil fraction; providing the steam cracked gas stream and the cracked gas fraction to an olefins separation unit to generate at least one light olefin stream comprising C3 and lighter olefins, a first light hydrocarbons stream comprising C2-C4 alkanes, a second light hydrocarbons stream comprising C2-C4 dienes and 2-butenes, and a fuel gas stream comprising hydrogen and methane; providing the first light hydrocarbons stream to the stream cracker unit and the second light hydrocarbons stream to a hydrogenation unit; providing the C4+ hydrocarbon stream to an aromatic extraction unit to generate an aromatics product stream and a residual stream; providing the residual stream to one or both of the first catalytic cracker unit and the hydrogenation unit to hydrogenate C5 to C9 hydrocarbons and generate a hydrogenated hydrocarbon stream; and providing the hydrogenated hydrocarbon stream to one or both of the steam cracker unit and the first catalytic cracker unit along with olefins/di-olefins saturation in the C6 to C8 aromatic rich stream and C9+ stream.

In additional embodiments, the process further includes providing the light cycle oil fraction and the C9+ hydrocarbon stream to a diesel preparation unit to generate a diesel fuel stream or diesel blend stream.

In accordance with one or more embodiments of the present disclosure, an integrated system for upgrading a hydrocarbon condensate stream to enhanced value streams is disclosed. The system includes a desalter unit; a first separation unit fluidly connected downstream of the desalter unit at an inlet port of the first separation unit and further comprising top, middle, and bottom outlet ports; a steam cracker unit fluidly connected downstream of the top outlet port of the first separation unit; a first catalytic cracker unit fluidly connected downstream of the middle outlet port of the first separation unit; a second catalytic cracker unit fluidly connected downstream of the bottom outlet port of the first separation unit; a fractionation tower fluidly connected downstream of an outlet of the first catalytic cracker unit and an outlet of the second catalytic cracker unit; an olefins separation unit fluidly connected downstream of the steam cracker unit and the fractionation tower; an aromatics extraction unit fluidly connected downstream of the steam cracker unit and fractionation tower; and a hydrogenation unit fluidly connected downstream of the olefins separation unit and the aromatics extraction unit.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Figure 1:
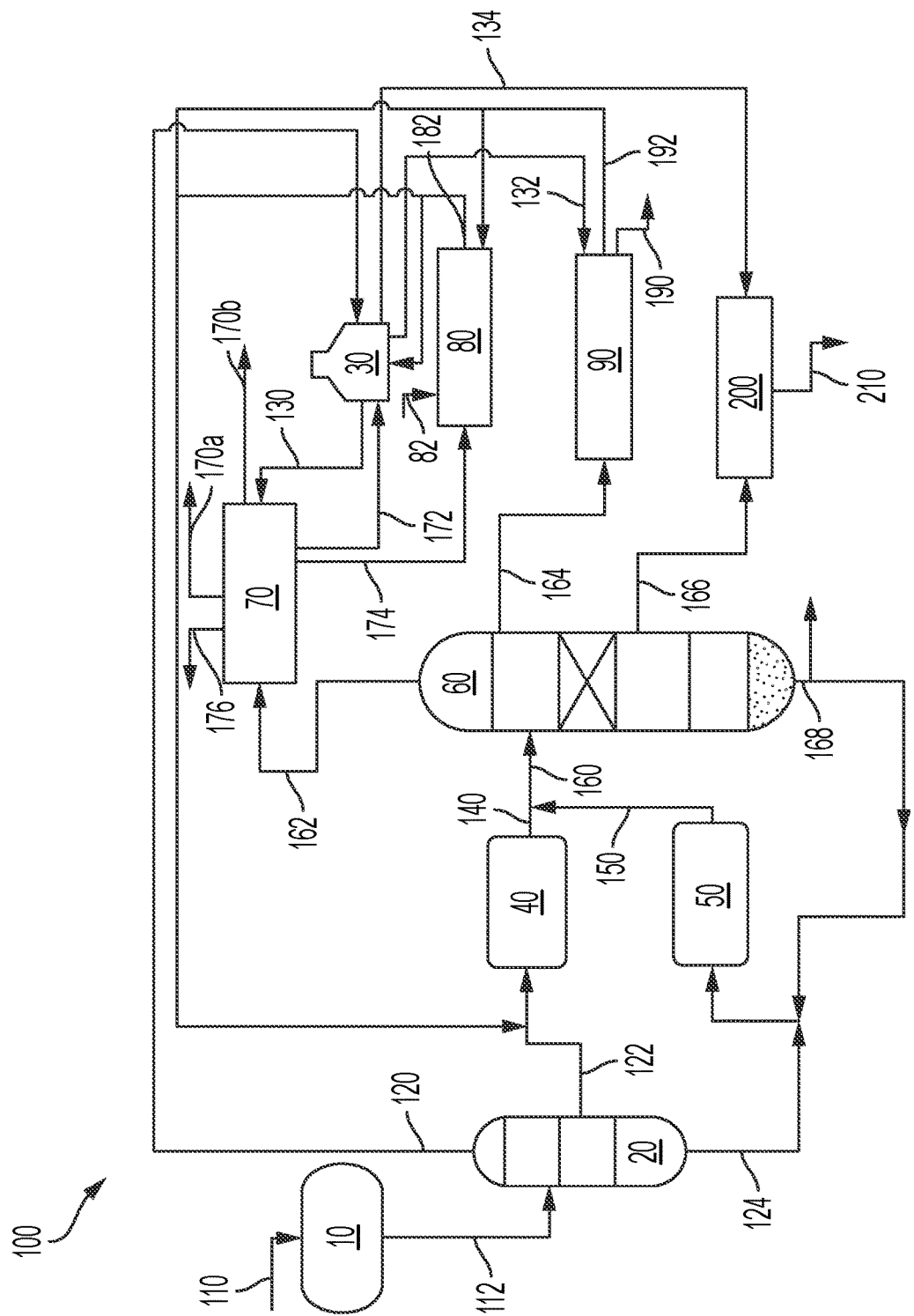
FIG. 1 is a schematic illustration of one or more embodiments of the integrated refinery process of the present disclosure.

For the purpose of these simplified schematic illustrations and the present description, the numerous valves, temperature sensors, electronic controllers and the like that are customarily employed and well known to those of ordinary skill in the art of certain refinery operations are not included. Further, accompanying components that are in conventional refinery operations such as, for example, air supplies, hydrogen supplies, catalyst hoppers, and flue gas handling are not necessarily shown.

It should further be noted that arrows in the drawings refer to pipes, conduits, channels, or other physical transfer lines that connect by fluidic communication one or more system apparatuses to one or more other system apparatuses. Additionally, arrows that connect to system apparatuses define inlets and outlets in each given system apparatus.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 2:
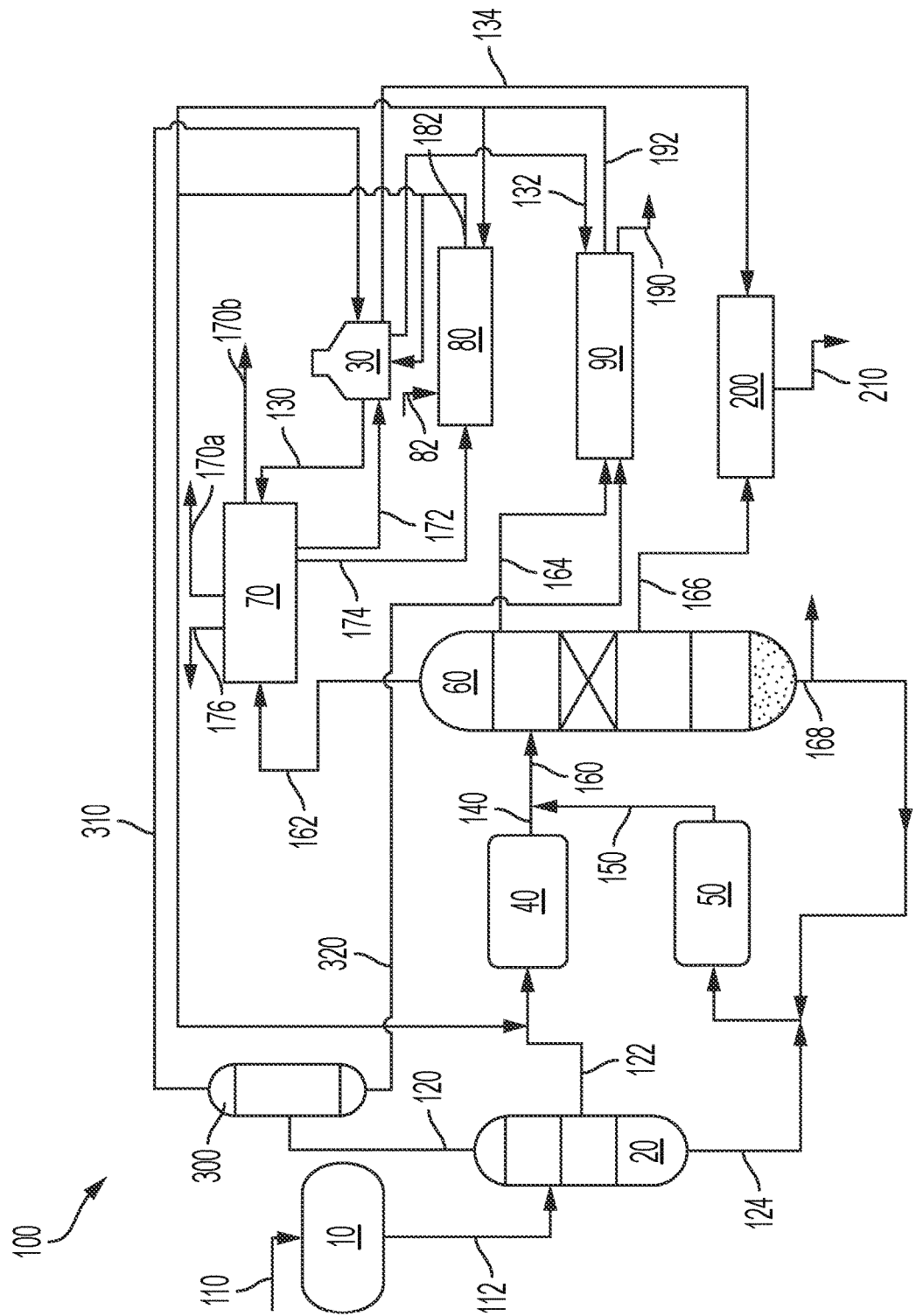
FIG. 2 is a schematic illustration of one or more embodiments of the integrated refinery process of the present disclosure including a second separation unit.
Figure 3:
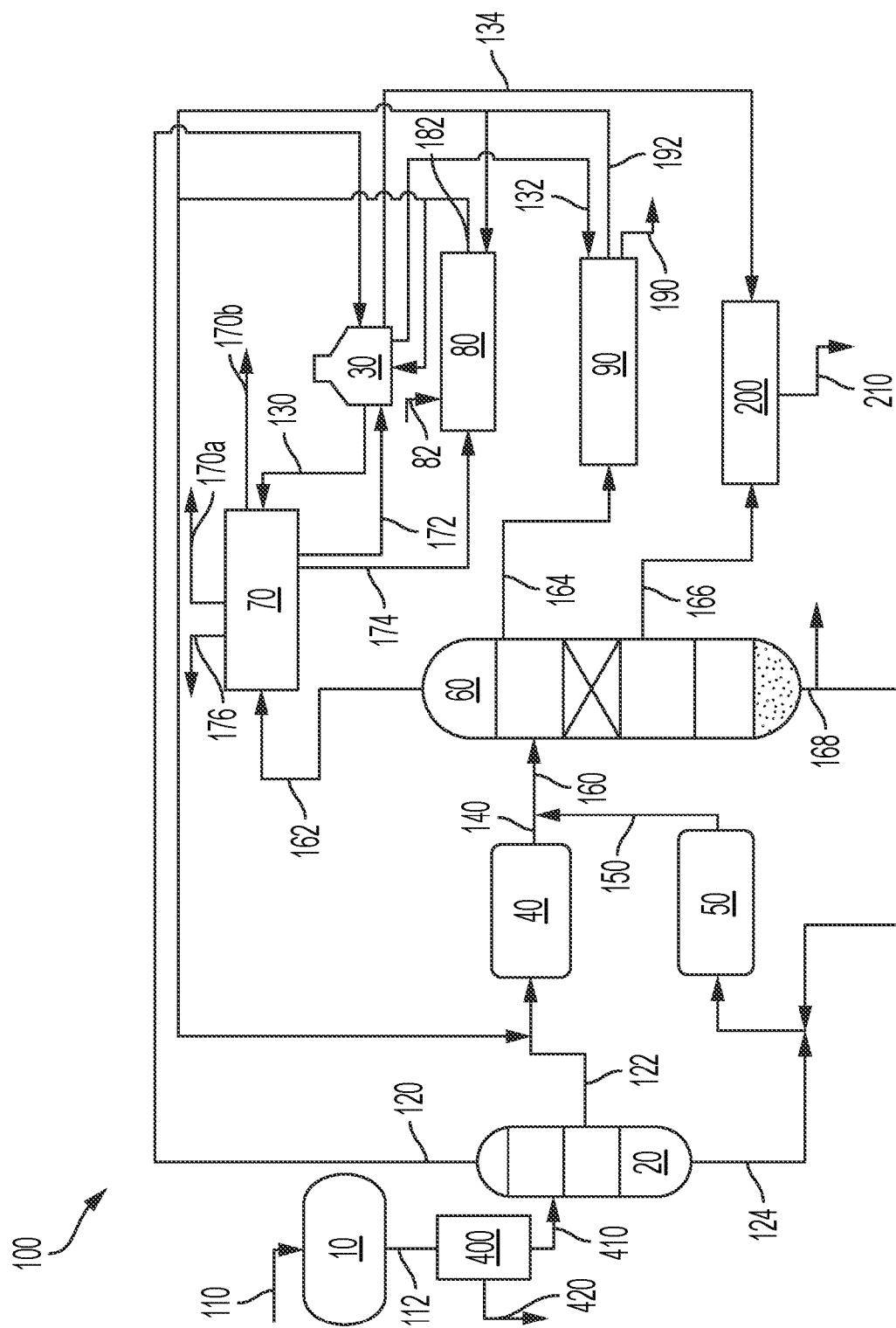
FIG. 3 is a schematic illustration of the integrated refinery process of the present disclosure including a hydrotreater.

Reference will now be made in detail to embodiments of an integrated process and associated system for upgrading a hydrocarbon condensate stream to enhanced value streams of the present disclosure. While the integrated system for upgrading a hydrocarbon condensate stream to enhanced value streams of FIGS. 1 through 3 are provided as exemplary, it should be understood that the present systems and methods encompass other configurations.

The processes and systems of the present disclosure provide an upgrading scheme for a hydrocarbon condensate stream to produce enhanced value streams such as light olefins and BTX (benzene, toluene, and xylenes) as well as diesel fuel. Specifically, the processes and systems of the present disclosure split hydrocarbon condensate into a multiple fractions, which may then be cracked and further processes in an appropriate reactor to maximize the yield of enhanced value petrochemicals while minimizing downstream units. As such, the integrated system and processes yield improved production of desired product such as light olefins and BTX or other enhanced value streams such as diesel fuel.

In one or more embodiments, an integrated process for upgrading a hydrocarbon condensate stream to enhanced value streams includes providing a feed stream 110 comprising the hydrocarbon condensate stream to a desalter unit 10 to remove salt from the feed stream 110 to generate a desalted feed stream 112. The process further comprises providing the desalted feed stream 112 to a first separation unit 20 to split the desalted feed stream 112 into a light cut 120, a middle cut 122, and a heavy cut 124. The light cut 120 and the middle cut 122 are split at a first cut temperature in the range of 90° C. to 200° C. and the middle cut and the heavy cut are split at a second cut temperature in the range of 300° C. to 360° C. Additionally, the process comprises providing the light cut 120 to a steam cracker unit 30 to generate a steam cracked gas stream 130, a C4+ hydrocarbon stream 132, and a C9+ hydrocarbon stream 134, wherein the C4+ hydrocarbon stream is rich in pyrolysis gasoline. The process also comprises providing the middle cut 122 to a first catalytic cracker unit 40 with a first catalyst disposed therein to generate a first cracked product stream 140 and providing the heavy cut 124 to a second catalytic cracker unit 50 with a second catalyst disposed therein to generate a second cracked product stream 150. The process additionally comprises providing the first cracked product stream 140 and the second cracked product stream 150 to a fractionation tower 60 to generate a cracked gas fraction 162, a catalytic cracked naphtha fraction 164, a light cycle oil fraction 166, and a heavy cycle oil fraction 168. Further, the process comprises providing the steam cracked gas stream 130 and the cracked gas fraction 162 to an olefins separation unit 70 to generate at least one light olefin stream 170 comprising C3 and lighter olefins, a first light hydrocarbons stream 172 comprising C2-C4 alkanes, a second light hydrocarbons stream 174 comprising C2-C4 dienes and 2-butenes, and a fuel gas stream 176 comprising hydrogen and methane. The process further comprises providing the first light hydrocarbons stream 172 to the stream cracker unit 30 and the second light hydrocarbons stream 174 to a hydrogenation unit 80. Further, the process comprises providing the C4+ hydrocarbon stream 132 to an aromatic extraction unit 90 to generate an aromatics product stream 190 and a residual stream 192 and providing the residual stream 192 to one or both of the first catalytic cracker unit 40 and/or the hydrogenation unit 80 to hydrogenate C5-C9 hydrocarbons and generate a hydrogenated hydrocarbon stream 182. Additionally, the process comprises providing the hydrogenated hydrocarbon stream 182 to one or both of the steam cracker unit 30 and/or the first catalytic cracker unit 40.

In one or more embodiments, an integrated system 100 for upgrading a hydrocarbon condensate stream to enhanced value streams includes a desalter unit 10 and a first separation unit 20 fluidly connected downstream of the desalter unit 10 at an inlet port of the first separation unit 20 and further comprising top, middle, and bottom outlet ports. The system 100 further includes a steam cracker unit 30 fluidly connected downstream of the top outlet port of the first separation unit 20, a first catalytic cracker unit 40 fluidly connected downstream of the middle outlet port of the first separation unit 20, and a second catalytic cracker unit 50 fluidly connected downstream of the bottom outlet port of the first separation unit 20. Additionally, the system 100 includes a fractionation tower 60 fluidly connected downstream of an outlet of the first catalytic cracker unit 40 and an outlet of the second catalytic cracker unit 50, a olefins separation unit 70 fluidly connected downstream of the fractionation tower 60 and the steam cracker unit 30, an aromatics extraction unit 90 fluidly connected downstream of the steam cracker unit 30 and the catalytic cracker units

40 and 50, and a hydrogenation unit 80 fluidly connected downstream of the olefins separation unit 70 and the aromatics extraction unit 90.

Having disclosed the basic operation of the integrated process and associated system for upgrading a hydrocarbon condensate stream to enhanced value streams, each step and unit operation of the embodiments of the integrated process and associated system are now provided in further detail.

Hydrocarbon Condensate Stream

The feed stream 110 comprises the hydrocarbon condensate stream. In one or more embodiments, the hydrocarbon condensate stream comprises a natural gas condensate. The hydrocarbon condensate stream may include hydrocarbons that contains 4 carbons (C4) up to hydrocarbons boiling over 650° C. as the major components of the stream. Further, the hydrocarbon condensate stream may include hydrocarbons with an API range from 45-55. A non-limiting example of the hydrocarbon condensate stream is Jafurah condensate. The physical properties of example hydrocarbon condensate streams in accordance with the present disclosure are provided in Tables 1, 2, and 3.

TABLE 1

Physical properties of typical Hydrocarbon Condensate streams

|  | Example 1 | Example 2 | Example 3 |
| --- | --- | --- | --- |
| API Gravity | 48 | 46 | 49 |
| Total Sulfur (wt %) | 0.215 | 0.198 | 0.125 |
| Salt in Crude (PTB) | 12 | 7.27 | 0.89 |
| Density at 60° F. (16.6° C.) (kg/cm$^3$) | 0.7909 | 0.7962 | 0.7847 |

TABLE 2

Composition of typical Hydrocarbon Condensate streams

|  | Sample 1 (wt %) | Sample 2 (wt %) | Sample 3 (wt %) |
| --- | --- | --- | --- |
| C1-C4 | 1.5 | 0.3 | 0.4 |
| Naphtha to 185° C. | 37.0 | 34.0 | 40.7 |
| 185° C. to 245° C. (Kerosene) | 13.7 | 14.9 | 17.6 |
| 245° C. to 365° C. (Gasoil) | 25.4 | 27.1 | 25.0 |
| 365° C. to 565° C. (Vacuum gasoil) | 19.8 | 21.2 | 14.3 |
| 565° C.+ (Residue) | 2.6 | 2.5 | 2.0 |

TABLE 3

Composition of separated fractions of a typical Hydrocarbon Condensate streams

| Cut range (° C.) | | | |
| --- | --- | --- | --- |
|  | C5-85° C. | 85° C. to 150° C. | 150° C. to 185° C. |
| Paraffins (wt %) | 91.91 | 51.02 | 54.38 |
| Naphthenes (wt %) | 7.44 | 19.39 | 25.52 |
| Aromatics (wt %) | 0.65 | 29.59 | 20.10 |

Desalter

In one or more embodiments, the feed stream 110 comprising the hydrocarbon condensate stream is provided to a desalter unit 10 to remove salt from the feed stream 110 to generate the desalted feed stream 112. It is noted that salts are dissolved in water within a hydrocarbon stream and not within the hydrocarbons themselves. In various embodiments, the residual salt in the desalted feed stream 112 may be less than 1 pounds of salt per thousand barrels (PTB), less than 0.75 PTB, or less than 0.5 PTB.

The desalter unit 10 may be any unit configured to remove salts from a hydrocarbon stream. Typical salts present in crude oil and hydrocarbon condensate streams include calcium, sodium and magnesium chlorides. If these compounds are not removed from the feed stream 110 further processing as part of the integrated process for upgrading a hydrocarbon condensate stream to enhanced value streams may generate undesirable reactions or have reduced efficiency. For example, elevated temperatures could result in water hydrolysis, which in turn allows the formation of corrosive hydrochloric acid. Further, sand, silts and salt cause deposits and foul heat exchangers or result in plugging of various unit operations. Additionally, sodium, arsenic and other metals can poison catalysts.

In one or more embodiments, the feed stream 110 comprising the hydrocarbon condensate stream to be desalted is heated to a temperature of 100 to 150° C. and mixed with 4 to 10% fresh water by volume, which dilutes the salt. The mixture is then pumped into a settling tank provided as part of the desalter unit 10 where the salt water separates from the hydrocarbons and is drawn off. In one or more embodiments, an electrostatic field may be applied by electrodes in the settling tank, inducing polarization of the water droplets within the feed stream 110 resulting in the water droplets clumping together and settling to the bottom of the tank for ease of removal.

First Separation Unit

In one or more embodiments, the desalted feed stream 112 is provided to the first separation unit 20 to split the desalted feed stream 112 into the light cut 120, the middle cut 122, and the heavy cut 124. The light cut 120 and the middle cut 122 are split at a first cut temperature and the middle cut 122 and the heavy cut 124 are split at a second cut temperature where the second cut temperature is greater than the first cut temperature. In various embodiments, the first cut temperature may be between 9° and 100° C., between 90 and 95° C., between 95 and 100° C., or approximately 90° C. In various further embodiments, the first cut temperature may be between 150 and 200° C., between 15° and 175° C., between 175 and 200° C., between 16° and 190° C., or between 160 and 180° C. In combination with the various disclosed first cut temperatures, in various embodiment, the second cut temperature may be between 30° and 360° C., between 33° and 360° C., between 340 and 360° C., or approximately 350° C.

Separation of the desalted feed stream 112 into the light cut 120, the middle cut 122, and the heavy cut 124 allows for each stream to be specifically processed based on the properties of each individual stream to maximize enhanced value stream production and processing efficiency.

The first separation unit 20 may be any unit configured to separate the desalted feed stream 112 into the light cut 120, the middle cut 122, and the heavy cut 124 with fractionation at the first cut temperature and the second cut temperature. The first separation unit 20 may comprise any unit operation or system known to those skilled in the art for separating a hydrocarbon stream by vapor pressure. An example first separation unit 20 is an atmospheric distillation unit. An atmospheric distillation unit utilizes fractional distillation by heating the feed to a temperature at which one or more fractions of the mixture will vaporize while leaving other fractions as liquid to separate the feed stream. Further, in various embodiments, the first separation unit 20 may be a simple flash column or true boiling point distillation with at least 15 theoretical plates.

In one or more embodiments, the first separation unit 20 comprises a plurality of separation units. For ease of illustration, the provided FIGS. 1 through 3 illustrate a single unit operation, but it will be appreciated that such unit operation may comprise multiple individual separator units to generate the disclosed product streams.

Steam Cracker

In one or more embodiments, the light cut 120 from the first separation unit 20 is provided to the steam cracker 30. As such, and with reference to FIGS. 1 and 2, the steam cracker 30 is fluidly connected to the first separation unit 20. Within the steam cracker 30 the light cut 120, which includes C2, C3, C4, and naphtha range hydrocarbons, is cracked to generate the steam cracked gas stream 130, the C4+ hydrocarbon stream 132 which majorly contains pyrolysis gasoline stream along with other C5-C9 hydrocarbons, and the C9+ hydrocarbon stream 134. The steam cracked gas stream 130 is rich in olefins including ethylene and propylene. The C4+ hydrocarbon stream 132 comprises naphtha-range hydrocarbons and has a high aromatics content and typical also includes aromatics, olefins, and paraffins ranging from C4+ components. Similarly, the C9+ hydrocarbon stream 134 includes the hydrocarbons with are greater than C9. It will be appreciated that in one or more embodiments, the C4+ hydrocarbon stream 132 and the C9+ hydrocarbon stream 134 may be provided from the steam cracker 30 as a single stream with subsequent separation or partitioning as beneficial to the process.

Generally, steam cracking is a petrochemical process in which saturated hydrocarbons are broken down into smaller, often unsaturated, hydrocarbons. In operation, light cut 120, as well as any other feeds to the steam cracker unit 30 as disclosed infra, is diluted with steam and briefly heated in a furnace of the steam cracker unit 30 in the absence of oxygen. The reaction occurs rapidly with a residence time on the order of milliseconds with the flow quickly quenched after reaching the cracking temperature to stop the cracking reaction. Specifically, the steam cracker 30 operates by heating the feed stream which includes the light cut 120 from the first separation unit 20 with steam to thermally crack the saturated hydrocarbons of light cut 120 into light olefins including ethylene and propylene. For purposes of the present disclosure, light olefins are considered to be C2-C4 alkenes including ethylene, propylene, and butylene.

In one or more embodiments, the steam cracker unit 30 is operated at a temperature ranging from 800° C. to 950° C. It will be appreciated that a greater cracking temperature, also referred to as severity, favors the production of shorter chain hydrocarbons as greater cracking occurs as compared to lower severity operation.

In one or more embodiments, the steam cracker unit 30 is operated with a steam to hydrocarbon weight ratio in the range of 0.2 to 0.8. In one or more further embodiments, the steam cracker unit 30 is operated with a steam to hydrocarbon weight ratio in the range of 0.2 to 0.5. It will be appreciated that the hydrocarbon to steam ratio represents the ratio of the hydrocarbons provided in the light cut 120 from the first separation unit 20 to the steam concurrently provided to the mixed steam cracker unit 30. If additional hydrocarbon streams are also provided to the steam cracker unit 30, the hydrocarbon to steam ratio represents the ratio of the hydrocarbons provided to the steam cracker unit 30 from all sources to the steam concurrently provided to the steam cracker unit 30.

Table 4, presented infra, provides generalized steam cracker yields generated based on the composition of the feed stream to the steam cracker unit 30. Yields, as a weight percentage, are provided for ethane, propane, butane, naphtha as well as gasoil which may all be provided in the light cut 120 in small quantities as a result of imperfection of separation in the first separation unit 20.

TABLE 4

Theoretical Steam Cracker Expected Yields Expected from Ethane to Gasoil range Feedstocks Yields, Wt %

| | |
|---|---|
| $H_2$ + methane | 10-20 |
| Ethylene | 20-80 |
| Propylene | 10-20 |
| Aromatics | Up to 30 |

First Catalytic Cracking Unit

In one or more embodiments, the middle cut 122 from the first separation unit 20 comprising hydrocarbons boiling between the first cut temperature and the second cut temperature is provided to the first catalytic cracker unit 40. As such, and with reference to FIGS. 1 and 2, the first catalytic cracker unit 40 is fluidly connected to the first separation unit 20. Within the first catalytic cracker unit 40 the middle cut 122 is cracked to generate the first cracked product stream 140.

Catalytic cracking is a conversion processes used in petroleum refineries and is utilized to convert high-boiling, high-molecular weight hydrocarbon fractions into lower-boiling, lower-molecular weight hydrocarbons such as more valuable gasoline, olefinic gases, and other products. In one or more embodiments, the first catalytic cracker unit 40 may operate as a fluidized bed reactor. In one or more particular embodiments, the first catalytic cracker unit 40 may comprises a fluidized bed reactor in the form of a riser reactor or a downer reactor to convert the middle cut 122 to the first cracked product stream 140.

As used herein, the term "downer" refers to a catalytic cracking reactor, such as a fluidized bed reactor, where the reactant flows in a generally downward direction such as, for example, entering the top and exiting the bottom of the reactor. Likewise, the term "riser" refers to a catalytic cracking reactor, such as a fluidized bed reactor, where the reactant flows in a generally upward direction such as, for example, entering the bottom and exiting the top of the reactor.

In one or more embodiments, as the first catalytic cracker unit 40 utilizes a first catalyst, the first catalytic cracker unit 40 may include a reactor/separator as well as a regeneration vessel for regenerating spent catalyst. As used herein, "spent catalyst" refers to catalyst which has undergone reaction and is at least partially coked. Also, as used herein, "regenerated catalyst" refers to catalyst that is exiting the catalyst regenerator and is at least partially or substantially free of coke, and "fresh catalyst" refers to catalyst that is newly entering the system and is at least partially or substantially free of coke. The middle cut 122 is admixed and intimately contacted with an effective quantity of heated fresh or regenerated first catalyst particles which catalytically crack hydrocarbon molecules within the middle cut 122 by carbon-carbon bond cleavage. The first cracked product stream 140 and the first catalyst are separated with the first catalyst cycled to the regeneration vessel for regeneration of the first catalyst.

In general, the operating conditions for the first catalytic cracker unit 40 in a configuration as a downer or a riser FCC unit include: a reaction temperature of from about 600° C. to about 700° C., in certain embodiments about 625° C. to about 700° C., and in further embodiments about 650° C. to about 700° C.; reaction pressure of from about 1 bar to about 20 bar, in certain embodiments about 1 bar to about 10 bar, and in further embodiments from about 1 bar to about 2 bar; contact time in the reactor of from about 0.1 seconds to about 3 seconds, in certain embodiments about 0.1 seconds to about 2 seconds, and in further embodiments about 0.1 seconds to about 1 seconds; and a catalyst-to-feed ratio on a weight basis of from about 3:1 to about 60:1, in certain embodiments about 4:1 to about 50:1, and in further embodiments about 6:1 to about 40:1. It is noted that the flow rate of the first catalyst entering the first catalytic cracker unit 40 divided by the flow rate of hydrocarbons entering the first catalytic cracker unit 40 defines the catalyst-to-feed ratio. When the sole feed to the first catalytic cracker unit 40 is the middle cut 122, the flow rate of the first catalyst entering the first catalytic cracker unit 40 divided by the flow rate of the middle cut 122 entering the first catalytic cracker unit 40 defines the catalyst-to-feed ratio.

In various embodiments, the first catalyst provided in the first catalytic cracker unit 40 may be a fluid catalytic cracking catalyst based on USY, zeolite beta, or ZSM-5. In one or more specific embodiments, the first catalyst provided in the first catalytic cracker unit 40 may be a mixture of 10 to 75 weight percent of a rare earth metal modified USY and 10 to 90 weight percent of a ZSM-5 zeolite. Further, in various embodiments, the ratio of rare earth metal modified USY to ZSM-5 may be 50:50, 60:40, 70:30, or 75:25. According to various embodiments, rare earth metals suitable for modification of the USY include lanthanum (La), cerium (Ce), yttrium (Y), and rhenium (Re). Further, in one or more embodiments, the USY may be modified with the rare earth metal at 0.5 to 8 wt. %.

Second Catalytic Cracking Unit

In one or more embodiments, the heavy cut 124 from the first separation unit 20 comprising hydrocarbons boiling at greater than second cut temperature is provided to the second catalytic cracker unit 50. As such, and with reference to FIGS. 1 and 2, the second catalytic cracker unit 50 is fluidly connected to the first separation unit 20. Within the second catalytic cracker unit 50 the heavy cut 124 is cracked to generate the second cracked product stream 150. The second cracked product stream 150 may be expected to have a lower catalytic cracked naphtha content and a greater light olefins content than the first cracked product stream 140.

According to one or more embodiments, the second catalytic cracker unit 50 may operate as a fluidized bed reactor. In one or more particular embodiments, the second catalytic cracker unit 50 may comprises a fluidized bed reactor in the form of a riser reactor or a downer reactor to convert the heavy cut 124 to the second cracked product stream 150.

In one or more embodiments, as the second catalytic cracker unit 50 utilizes a second catalyst, the second catalytic cracker unit 50 may include a reactor/separator as well as a regeneration vessel for regenerating spent catalyst. The heavy cut 124 is admixed and intimately contacted with an effective quantity of heated fresh or regenerated second catalyst particles which catalytically crack hydrocarbon molecules within the heavy cut 124 by carbon-carbon bond cleavage. The second cracked product stream 150 and the second catalyst are separated with the second catalyst cycled to the regeneration vessel for regeneration of the second catalyst.

In general, the operating conditions for the second catalytic cracker unit 50 in a configuration as a downer or a riser FCC unit include: a reaction temperature of from about 500° C. to about 650° C., in certain embodiments about 525° C. to about 650° C., and in further embodiments about 550° C. to about 650° C.; reaction pressure of from about 1 bar to about 20 bar, in certain embodiments about 1 bar to about 10 bar, and in further embodiments from about 1 bar to about 2 bar; contact time in the reactor of from about 0.1 seconds to about 3 seconds, in certain embodiments about 0.1 seconds to about 2 seconds, and in further embodiments about 0.1 seconds to about 1 seconds; and a catalyst-to-feed ratio on a weight basis of from about 3:1 to about 60:1, in certain embodiments about 4:1 to about 50:1, and in further embodiments about 6:1 to about 40:1. It is noted that the flow rate of the second catalyst entering the second catalytic cracker unit 50 divided by the flow rate of hydrocarbons entering the second catalytic cracker unit 50 defines the catalyst-to-feed ratio. When the sole feed to the second catalytic cracker unit 50 is the heavy cut 124, the flow rate of the second catalyst entering the second catalytic cracker unit 50 divided by the flow rate of the heavy cut 124 entering the second catalytic cracker unit 50 defines the catalyst-to-feed ratio.

In various embodiments, the second catalyst provided in the second catalytic cracker unit 50 may be a fluid catalytic cracking catalyst based on USY, zeolite beta, or ZSM-5. In one or more specific embodiments, the second catalyst provided in the second catalytic cracker unit 50 may be a mixture of 20 to 80 weight percent of a rare earth metal modified USY and 20 to 80 weight percent of a ZSM-5 zeolite. Further, in various embodiments, the ratio of rare earth metal modified USY to ZSM-5 may be 50:50, 60:40, 70:30, 75:25, or 80:20. According to various embodiments, rare earth metals suitable for modification of the USY include lanthanum (La), cerium (Ce), yttrium (Y), and rhenium (Re). Further, in one or more embodiments, the USY may be modified with the rare earth metal at 0.5 to 8 wt. %.

Fractionation Tower

In one or more embodiments, the first cracked product stream 140 and the second cracked product stream 150 are combined into a combined cracked product stream 160 which is provided to the fractionation tower 60 to split the combined cracked product stream 160 into the light cracked gas fraction 162, the catalytic cracked naphtha fraction 164, the light cycle oil fraction 166, and the heavy cycle oil fraction 168. As such, and with reference to FIGS. 1 through 3, the fractionation tower 60 is fluidly connected to both the first catalytic cracker unit 40 and the second catalytic cracker unit 50.

According to one or more embodiments, the light cracked gas fraction 162 comprises hydrogen and hydrocarbons boiling at less than 30° C., the catalytic cracked naphtha fraction 164 comprises hydrocarbons boiling in the range of 30° C. to 185° C., the light cycle oil fraction 166 comprises hydrocarbons boiling in the range of 185° C. to 350° C., and the heavy cycle oil fraction 168 comprises hydrocarbons boiling at greater than 350° C. In various embodiments, the split between the light cracked gas fraction 162 and the catalytic cracked naphtha fraction 164 may be at a temperature between 10 and 50° C., between 15 and 45° C., between 20 and 40° C., or approximately 30° C. In various embodiments, the split between the catalytic cracked naphtha fraction 164 and the light cycle oil fraction 166 may be at a temperature between 160 and 250° C., between 17° and 230° C., between 170 and 220° C., or approximately 185° C. In various embodiments, the split between the light cycle oil fraction 166 and the heavy cycle oil fraction 168 may be at a temperature between 32° and 380° C., between 33° and 370° C. between 34° and 360° C., or approximately 350° C.

The fractionation tower 60 may be any unit configured to separate combined cracked product stream 160 formed from the first cracked product stream 140 and the second cracked product stream 150 into the light cracked gas fraction 162, the catalytic cracked naphtha fraction 164, the light cycle oil fraction 166, and the heavy cycle oil fraction 168. The fractionation tower 60 may comprise any unit operation or system known to those skilled in the art for separating a hydrocarbon stream by vapor pressure. An example fractionation tower 60 is an atmospheric distillation unit as previously described with regards to the first separation unit 20. Further, in various embodiments, the fractionation tower 60 may be a simple flash column or true boiling point distillation with at least 15 theoretical plates.

In one or more embodiments, the fractionation tower 60 comprises a plurality of separation units. For ease of illustration, the provided FIGS. 1 through 3 illustrate a single unit operation, but it will be appreciated that such unit operation may comprise multiple individual separator units to generate the disclosed product streams.

Olefins Separation Unit

In one or more embodiments, the steam cracked gas stream 130 and the light cracked gas fraction 162 are provided to the olefins separation unit 70 to generate the at least one light olefin stream 170 comprising C3 and lighter olefins, the first light hydrocarbons stream 172 comprising C2-C4 saturated hydrocarbons, the second light hydrocarbons stream 174 comprising C2-C4 dienes and higher hydrocarbons, and the fuel gas stream 176 comprising hydrogen and methane. The at least one light olefin stream 170 may be divided into a first light olefin stream 170a comprising ethylene and propylene and a second light olefin stream 170b comprising 1-butene and isobutylene which may be collected as one or more enhanced value streams. Note that, 1,3-Butadiene is converted either to butenes (or) can be extracted as a product at the steam cracker downstream section at the olefin separation unit. As such, and with reference to FIGS. 1 and 2, the olefins separation unit 70 is fluidly connected to outlet streams of both the steam cracker unit 30 and the fractionation tower 60.

It will be appreciated that processing both the steam cracked gas stream 130 and the light cracked gas fraction 162 within the olefins separation unit 70 in a consolidated manner reduces the capital and operational expenditures for the integrated process. Specifically, the single combined unit for the olefins separation unit 70 eliminates the capital expense of installation of two or more separate units as well as the operational efficiency of scale through operation of a single larger unit. Further, ethylene production in the first catalytic cracker unit 40 and the second catalytic cracker unit 50 is low compared to ethylene production in the steam cracker unit 30 allowing for improved efficiency by performing a single separation opposed to independent separation of the effluent from each district unit operation.

In one or more embodiments, the first light hydrocarbon stream 172 and the second light hydrocarbon stream 174 are passed to further unit operations for continued processing to generate additional enhanced value streams. For example, in one or more embodiments, the first light hydrocarbon stream 172 which includes alkane by products such as ethane, propane, and butane is recycled back to the steam cracker unit 30 for further processing to generate additional ethylene and propylene. Similarly, in one or more embodiments, the second light hydrocarbon stream 174 is passed to the hydrogenation unit 80. As such, in various embodiments, the olefins separation unit 70 is fluidly connected as an inlet stream to the steam cracker unit 30 for recycling the first light hydrocarbon stream 172 and an inlet stream to the hydrogenation unit 80 for processing the second light hydrocarbon stream 174.

The olefins separation unit 70 operates on principles known to know skilled in the art for separation of olefin streams. Specifically, in various embodiments, the olefins separation unit 70 utilizes compression, cooling, and fractionation to separate and generate the various effluent streams from the olefins separation unit 70. The particular separation, the generated streams, and further processing of each generated stream in accordance with the presently disclosed process distinguishes over current process. Accordingly, the olefins separation unit 70 may include various unit operations known to those skilled in the art to generate the disclosed streams, such unit operation including a demethanizer, a deethanizer, a depropanizer, a debutanizer, a C2 splitter, or a C3 splitter, may or may not include extraction of 1,3 Butadiene depending on the market demand, as well as their combinations.

Aromatics Extraction Unit

In one or more embodiments, the C4+ hydrocarbon stream 132 is provided to the aromatics extraction unit 90 to generate the aromatic product stream 190 and a residual stream 192 containing other non-aromatic C5-C9 hydrocarbons. The aromatic product stream 190 is an enhanced value stream which includes various valuable aromatics including benzene, toluene and xylenes (BTX). Further, in one or more embodiments, the residual stream 192 which includes the remaining hydrocarbons (C5-C9) after separation of aromatics in the aromatic products stream 190 is recycled as an input to the first catalytic cracker unit 40, or based on the dienes content send to the hydrogenation unit 80. As such, and with reference to FIGS. 1 and 2, the aromatics extraction unit 90 is fluidly connected to an output of the steam cracker unit 30 and an output of the fractionation tower 60 as well as an input of the first catalytic cracker unit 40 and the hydrogenation unit 80.

Hydrogenation Unit

In one or more embodiments, the second light hydrocarbon stream 174 comprising C2-C4 dienes and 2-butene is provided to the hydrogenation unit 80. Further, in one or more embodiments, at least a portion of the residual stream 192 is also provided to the hydrogenation unit 80. The hydrogenation unit 80 generates the hydrogenated hydrocarbon stream 182. Specifically, the C4+ hydrocarbon stream 132 coming from the steam cracker unit 30 includes of aromatics and other C5-C9 hydrocarbons. After extraction of aromatics from this stream, the residual stream 192 may be sent to the hydrogenation unit 80 based on dienes content or to the first catalytic cracker unit 40. As such, and with reference to FIGS. 1 and 2, the hydrogenation unit 80 is fluidly connected to the olefins separation unit 70 and aromatic extraction unit 90.

One skilled in the art will appreciate that hydrogenation is commonly performed in a fixed-bed catalytic reactor. Within the hydrogenation unit 80 unsaturated hydrocarbon, such as an alkene or alkyne, is reduced in the presence of hydrogen from hydrogen feed 82 to form a fully saturated or more saturated hydrocarbon.

The hydrogenation unit 80 may alternatively be known as a gasoline hydrogenation unit (GHU) or a pygas hydrogenation unit (PHU).

The hydrogenation unit 80 may be operated as various operation conditions. Typically, for C4 dienes such as 1,3-butadiene hydrogenation is completed at 30 to 50° C. and at 6 to 12 bar pressure in a fixed bed catalytic reactor in the presence of $H_2$. Similarly C5-C9 hydrocarbons may also be hydrogenated based on conditions and operating parameters known to those skilled in the art. Typical units serving as the hydrogenation unit 80 may be known to those skilled in the art as acetylene, methylacetylene-propadiene (MAPD), 1,3-butadiene, or pentadiene hydrogenation units.

Diesel Preparation Unit

In one or more embodiments, the light cycle oil fraction 166 and the C9+ hydrocarbon stream 134 are provided to a diesel preparation unit 200 to generate a diesel fuel or diesel blending stream 210. The diesel preparation unit 200 combines the light cycle oil fraction 166 and the C9+ hydrocarbon stream 134 to form diesel fuel or a stream diesel blending. Specifically, the diesel preparation unit 200 blends the light cycle oil fraction 166 and the C9+ hydrocarbon stream 134 to generate the diesel fuel or diesel blending stream 210 matching established specifications for diesel fuel or diesel blending components.

Second Separation Unit

In one or more embodiments, referring to FIG. 2, the light cut 120 from the first separation unit 20 is provided to a second separation unit 300 to generate a paraffinic rich naphtha stream 310 and an aromatics rich stream 320. In various embodiments, the paraffinic rich naphtha stream 310 and the aromatics rich stream 320 are formed from splitting the light cut 120 from the first separation unit 20 at a temperature in the range of 60° C. to 130° C., 70° C. to 120° C., 80° C. to 115° C., or 90° C. to 110° C.

In embodiments utilizing the second separation unit 300, the paraffinic rich naphtha stream 310 is provided to the steam cracker unit 30 in lieu of the light cut 120. The paraffinic hydrocarbons of the paraffinic rich naphtha stream 310 readily may be converted to light olefins including ethylene and propylene in the steam cracker unit 30. Further, separation of the aromatics rich stream 320 from the light cut 120 before provision to the steam cracker unit 30 allows for the aromatics within the light cut 120 to be more efficiently and wholly captured as an enhanced value stream and reduces overall energy consumption recovering products at the upstream section.

In embodiments utilizing the aromatic separation unit 300, the aromatics rich stream 320 is provided directly to the aromatics extraction unit 90. Providing the aromatics rich stream 320 directly to the aromatics extraction unit 90 allows for the aromatics, including BTX, within the light cut 120 to be efficiently captured without conversion or unnecessary heating and processing in intervening unit operations such as the steam cracker unit 30 and the olefins separation unit 70.

The second separation unit 300 may be any unit configured to separate the light cut 120 from the first separation unit 20 into the paraffinic rich naphtha stream 310 and the aromatics rich stream 320. The second separation unit 300 may comprise any unit operation or system known to those skilled in the art for separating a hydrocarbon stream by vapor pressure. Example second separation units 300 include an extractive distillation column using commercial solvents, a divided wall column, or a conventional separation column. Further, in various embodiments, the second separation unit 300 may be a simple flash column or true boiling point distillation with at least 15 theoretical plates.

In one or more embodiments, the second separation unit 300 comprises a plurality of separation units. For ease of illustration, the provided FIG. 2 illustrate a single unit operation, but it will be appreciated that such unit operation may comprise multiple individual separator units to generate the disclosed product streams with enhanced purity.

Hydrotreater

In one or more embodiments, as shown in FIG. 3, the desalted feed stream 112 is provided to a hydrotreater 400. The hydrotreater 400 hydrotreats the desalted feed stream 112 to remove nitrogen, sulfur, and other impurities to generate a hydrotreated feed stream 410 before feeding the hydrotreated feed stream 410 to the first separation unit 20. As such, and with reference to FIG. 3, the hydrotreater 400 is fluidly connected to both the desalter unit 10 and the first separation unit 20. In one or more embodiments and with reference to FIG. 3, the hydrotreated feed stream 410 is provided in lieu of the desalted feed stream 112 to the first separation unit 20. It will be appreciated that hydrotreating as performed in the hydrotreater 400 is the reaction of organic compounds in the presence of high pressure hydrogen to remove oxygen along with other heteroatoms such as nitrogen, sulfur, and chlorine through saturating the carbon-carbon bonds of the organic compounds in the feed stream.

Saturating the carbon-carbon bonds of the hydrocarbons in desalted feed stream 112 removes heteroatoms such as nitrogen, sulfur, and chlorine by generating ammonia, hydrogen sulfide, and HCl respectively which may be separated out in a hydrotreater waste stream 420. In one or more embodiments, the hydrotreated feed stream 410 exiting the hydrotreater 400 comprises less than 800 ppm nitrogen and less than 900 ppm sulfur. In various further embodiments, the hydrotreated feed stream 410 comprises less than 750 ppm nitrogen, less than 650 ppm nitrogen, less than 550 ppm nitrogen, less than 500 ppm nitrogen, or 370 to 750 ppm nitrogen. In various embodiments, the hydrotreated feed stream 410 comprises less than 850 ppm sulfur, less than 750 ppm sulfur, less than 500 ppm sulfur, less than 300 ppm sulfur, or 150 to 820 ppm sulfur.

Operation of the hydrotreater 400 includes mixing the desalted feed stream 112 with hydrogen gas, heating and pressurizing the resultant mixture, and passing the same over a catalyst to convert the sulfur containing compounds to hydrogen sulfide and desulfinated hydrocarbons, the nitrogen containing compounds to ammonia and denitrogenated hydrocarbons, and the chloride containing compounds to HCl and dechlorinated compounds. In one or more embodiments, the hydrotreater 400 may comprise a CoMo/alumina or NiMo/alumina catalyst.

In one or more embodiments, the hydrotreater 400 may operate at a temperature of 280 to 450° C. In one or more embodiments, the hydrotreater 400 may operate at a pressure of 5 to 160 bar with the introduction of hydrogen via a hydrogen inlet. In various further embodiments, the hydrotreater 400 may operate at a temperature of 280 to 425° C., 280 to 400° C., or 280 to 350° C. and a pressure of 5 to 100 bar, 5 to 50 bar, 20 to 160 bar, 20 to 100 bar or 20 to 50 bar. In one or more embodiments, the hydrotreater 400 may operate with a space velocity of the hydrocarbon of 1 to 10 $h^{-1}$.

Further Processing

In one or more embodiments and with reference to FIGS. 1 through 3, the heavy cycle oil fraction 168 from the fractionation tower 60 is simply collected for utilization as fuel oil. Further, in one or more embodiments, the heavy cycle oil fraction 168 from the fractionation tower 60 is recycled as an additional feed stream to the second catalytic cracker 50. As such, and with reference to FIGS. 1 through 3, the fractionation tower 60 may be fluidly connected to the second catalytic cracker unit 50 in on or more embodiments. It will be appreciated that recycling all or a portion of the heavy cycle oil fraction 168 within the integrated system to the second catalytic cracker unit 50 enhances generation of light olefins and aromatics. However, when demand for fuel oil is high, collection of the heavy cycle oil fraction 168 for utilization as fuel oil may be selected in lieu of recycling the heavy cycle oil fraction 168.

EXAMPLES

The following example illustrates features of the present disclosure but is not intended to limit the scope of the disclosure.

To demonstrate the process of the present disclosure, a process simulation was performed. An example feed condensate as disclosed in Table 1 was used to simulate the process configuration according to FIG. 1 and simulated the overall yields of various components. In this simulation, light fraction stream 120 from the first separator 20 was directly processed in the steam cracker unit 30, the middle cut 122 was processed in the first catalytic cracker 40 with a first catalyst, and the heavy cut 124 was processed in the second catalytic cracker with a second catalyst. [INVENTORS: Do you know what catalyst was simulated for the first and second catalyst?] Unconverted light gases from C2 to C9 were recycled back to the steam cracker unit 30 to increase the chemicals yield. Light olefins (C2 & C3) were separated and taken as products. Other olefins were saturated in the hydrogenation unit 80 and further processed in the steam cracker unit 30. Overall chemicals yield may be calculated as approximately 73% w/w which is higher than the chemicals yield from conventional configuration (58% w/w) representing a conventional steam cracker and hydrocracker.

| Overall Yields | % w/w Conventional Configuration | % w/w Configuration in FIG. 1 |
|---|---|---|
| Ethylene | 25.9 | 26.2 |
| Propylene | 13.7 | 22.3 |
| Aromatics | 12.9 | 16.4 |
| Fuel gas | 11.1 | 10.6 |
| Isobutylene | 1.1 | 4.8 |
| 1-Butene | 4.2 | 3.5 |
| Others | 0.2 | 0.1 |
| Ammonia | 0.02 | 0.0 |
| Diesel | 19.1 | 5.5 |
| Pyoil/C9+ | 11.9 | 6.3 |
| Heavy Cycle Oil | 0.0 | 1.5 |
| Coke | 0.0 | 2.7 |
| Total | 100.0 | 100.0 |

It should now be understood the various aspects of the integrated process and system for upgrading a hydrocarbon condensate stream to enhanced value streams are described and such aspects may be utilized in conjunction with various other aspects.

According to a first aspect, an integrated process for upgrading a hydrocarbon condensate stream to enhanced value streams includes providing a feed stream comprising the hydrocarbon condensate stream to a desalter unit to remove salt from the feed stream to generate a desalted feed stream; providing the desalted feed stream to a first separation unit to split the desalted feed stream into a light cut, a middle cut, and a heavy cut, where the light cut and the middle cut are split at a first cut temperature in the range of 90° C. to 200° C. and the middle cut and the heavy cut are split at a second cut temperature in the range of 300° C. to 360° C.; providing the light cut to a steam cracker unit to generate a steam cracked gas stream, a C4+ hydrocarbon stream, and a C9+ hydrocarbon stream, wherein the C4+ hydrocarbon stream is rich in pyrolysis gasoline; providing the middle cut to a first catalytic cracker unit with a first catalyst disposed therein to generate a first cracked product stream; providing the heavy cut to a second catalytic cracker unit with a second catalyst disposed therein to generate a second cracked product stream; providing the first cracked product stream and the second cracked product stream to a fractionation tower to generate a cracked gas fraction, a catalytic cracked naphtha fraction, a light cycle oil fraction, and a heavy cycle oil fraction; providing the steam cracked gas stream and the cracked gas fraction to an olefins separation unit to generate at least one light olefin stream comprising C3 and lighter olefins, a first light hydrocarbons stream comprising C2-C4 alkanes, a second light hydrocarbons stream comprising C2-C4 dienes and 2-butenes, and a fuel gas stream comprising hydrogen and methane; providing the first light hydrocarbons stream to the steam cracker unit and the second light hydrocarbons stream to a hydrogenation unit; providing the C4+ hydrocarbon stream to an aromatic extraction unit to generate an aromatics product stream and a residual stream; providing the residual stream to one or both of the first catalytic cracker unit and the hydrogenation unit to hydrogenate C5 to C9 hydrocarbons and generate a hydrogenated hydrocarbon stream; and providing the hydrogenated hydrocarbon stream to one or both of the steam cracker unit and the first catalytic cracker unit.

A second aspect includes the process of the first aspect in which in which the hydrocarbon condensate stream comprises a natural gas condensate.

A third aspect includes the process of the second aspect in which the natural gas condensate comprises an API range from 45 to 55.

A fourth aspect includes the process of any of the first through third aspects in which the first cut temperature is in the range of 90° C. to 100° C. and the second cut temperature is in the range of 300° C. to 360° C.

A fifth aspect includes the process of any of the first through third aspects in which the first cut temperature is in the range of 150° C. to 200° C. and the second cut temperature is in the range of 300° C. to 360° C.

A sixth aspect includes the process of the fifth aspect in which the light cut from the first separation unit is provided to a second separation unit to generate a paraffinic rich naphtha stream and an aromatics rich stream, where the paraffinic rich naphtha stream and the aromatics rich stream are cut at a temperature in the range of 90° C. to 110° C.

A seventh aspect includes the process of the sixth aspect in which the paraffinic rich naphtha stream is provided to the steam cracker unit in lieu of the light cut.

An eighth aspect includes the process of the sixth or seventh aspect in which the aromatics rich stream is provided to the aromatics extraction unit.

A ninth aspect includes the process of any of the first through eighth aspects in which the second cut temperature is 350° C.

A tenth aspect includes the process of any of the first through ninth aspects in which the desalted feed stream is hydrotreated to remove nitrogen and sulfur before feeding to the first separation unit.

An eleventh aspect includes the process of any of the first through tenth aspects in which the process further comprises providing the light cycle oil fraction and the C9+ hydrocarbon stream to a diesel preparation unit to generate a diesel fuel stream or diesel blend stream.

A twelfth aspect includes the process of any of the first through eleventh aspects in which the heavy cycle oil fraction is recycled as a feed stream to the second catalytic cracker.

A thirteenth aspect includes the process of any of the first through twelfth aspects in which the aromatics extraction unit additionally generates a residual stream, the residual stream recycled as an input to the first catalytic cracker unit.

A fourteenth aspect includes the process of any of the first through thirteenth aspects in which the aromatics extraction unit additionally generates a residual stream, the residual stream recycled as an input to the hydrogenation unit.

A fifteenth aspect includes the process of any of the first through fourteenth aspects in which the cracked gas fraction comprises hydrogen and hydrocarbons boiling at less than 30° C., the catalytic cracked naphtha fraction comprises hydrocarbons boiling in the range of 30° C. to 185° C., the light cycle oil fraction comprises hydrocarbons boiling in the range of 185° C. to 350° C., and the heavy cycle oil fraction comprises hydrocarbons boiling at greater than 350° C.

A sixteenth aspect includes the process of any of the first through fifteenth aspects in which the first catalytic cracking unit is operated at a temperature between 60° and 700° C., a catalyst to feed weight ratio of 2 to 40, and a residence time of 0.1 to 4 seconds.

A seventeenth aspect includes the process of any of the first through sixteenth aspects in which the first catalyst comprises a mixture of 10 to 75 weight percent of a rare earth metal modified USY and 10 to 90 weight percent of a ZSM-5 zeolite.

An eighteenth aspect includes the process of any of the first through seventeenth aspects in which the second catalytic cracking unit is operated at a temperature between 50° and 650° C., a catalyst to feed weight ratio of 2 to 40 and a residence time of 0.1 to 4 seconds.

A nineteenth aspect includes the process of any of the first through eighteenth aspects in which the second catalyst comprises a mixture of 20 to 80 weight percent of a rare earth metal modified USY and 20 to 80 weight percent of a ZSM-5 zeolite.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

For purposes of this disclosure, it is explicitly noted that indication that one stream or effluent is passed or provided from one unit to another unit includes embodiments where the stream or effluent is passed directly from one unit to another unit as well as embodiments where there is an intervening system or unit which may substantially change the composition of the stream or effluent between the units. As used in the present disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Similarly, indication that two systems are "fluidly connected" indicates that streams may be passed directly between the systems. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrocarbon stream" passing to a first system component or from a first system component to a second system component should be understood to equivalently disclose "hydrocarbon" passing to the first system component or passing from a first system component to a second system component.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. An integrated process for upgrading a hydrocarbon condensate stream to enhanced value streams, the process comprising:
   providing a feed stream comprising the hydrocarbon condensate stream to a desalter unit to remove salt from the feed stream to generate a desalted feed stream;
   providing the desalted feed stream to a first separation unit to split the desalted feed stream into a light cut, a middle cut, and a heavy cut, where the light cut and the middle cut are split at a first cut temperature in the range of 90° C. to 200° C. and the middle cut and the heavy cut are split at a second cut temperature in the range of 300° C. to 360° C.;
   providing the light cut to a steam cracker unit to generate a steam cracked gas stream, a C4+ hydrocarbon stream, and a C9+ hydrocarbon stream, wherein the C4+ hydrocarbon stream is rich in pyrolysis gasoline;
   providing the middle cut to a first catalytic cracker unit with a first catalyst disposed therein to generate a first cracked product stream;
   providing the heavy cut to a second catalytic cracker unit with a second catalyst disposed therein to generate a second cracked product stream;

providing the first cracked product stream and the second cracked product stream to a fractionation tower to generate a cracked gas fraction, a catalytic cracked naphtha fraction, a light cycle oil fraction, and a heavy cycle oil fraction;

providing the steam cracked gas stream and the cracked gas fraction to an olefins separation unit to generate at least one light olefin stream comprising C3 and lighter olefins, a first light hydrocarbons stream comprising C2-C4 alkanes, a second light hydrocarbons stream comprising C2-C4 dienes and 2-butenes, and a fuel gas stream comprising hydrogen and methane;

providing the first light hydrocarbons stream to the stream cracker unit and the second light hydrocarbons stream to a hydrogenation unit;

providing the C4+ hydrocarbon stream to an aromatic extraction unit to generate an aromatics product stream and a residual stream;

providing the residual stream to one or both of the first catalytic cracker unit and the hydrogenation unit to hydrogenate C5 to C9 hydrocarbons and generate a hydrogenated hydrocarbon stream; and providing the hydrogenated hydrocarbon stream to one or both of the steam cracker unit and the first catalytic cracker unit.

2. The process of claim 1, wherein the hydrocarbon condensate stream comprises a natural gas condensate.

3. The process of claim 2, wherein the natural gas condensate comprises an API range from 45 to 55.

4. The process of claim 1, wherein the first cut temperature is in the range of 90° C. to 100° C. and the second cut temperature is in the range of 300° C. to 360° C.

5. The process of claim 4, wherein the second cut temperature is 350° C.

6. The process of claim 1, wherein the first cut temperature is in the range of 150° C. to 200° C. and the second cut temperature is in the range of 300° C. to 360° C.

7. The process of claim 6, wherein the second cut temperature is 350° C.

8. The process of claim 6, wherein the light cut from the first separation unit is provided to a second separation unit to generate a paraffinic rich naphtha stream and an aromatics rich stream, where the paraffinic rich naphtha stream and the aromatics rich stream are cut at a temperature in the range of 90° C. to 110° C.

9. The process of claim 8, wherein the paraffinic rich naphtha stream is provided to the steam cracker unit in lieu of the light cut.

10. The process of claim 8, wherein the aromatics rich stream is provided to the aromatics extraction unit.

11. The process of claim 1, wherein the desalted feed stream is hydrotreated to remove nitrogen and sulfur before feeding to the first separation unit.

12. The process of claim 1, wherein the process further comprises providing the light cycle oil fraction and the C9+ hydrocarbon stream to a diesel preparation unit to generate a diesel fuel stream or diesel blend stream.

13. The process of claim 1, wherein the heavy cycle oil fraction is recycled as a feed stream to the second catalytic cracker.

14. The process of claim 1, wherein the aromatics extraction unit additionally generates a residual stream, the residual stream recycled as an input to the first catalytic cracker unit.

15. The process of claim 1, wherein the aromatics extraction unit additionally generates a residual stream, the residual stream recycled as an input to the hydrogenation unit.

16. The process of claim 1, wherein the cracked gas fraction comprises hydrogen and hydrocarbons boiling at less than 30° C., the catalytic cracked naphtha fraction comprises hydrocarbons boiling in the range of 30° C. to 185° C., the light cycle oil fraction comprises hydrocarbons boiling in the range of 185° C. to 350° C., and the heavy cycle oil fraction comprises hydrocarbons boiling at greater than 350° C.

17. The process of claim 1, wherein the first catalytic cracking unit is operated at a temperature between 60° and 700° C., a catalyst to feed weight ratio of 2 to 40, and a residence time of 0.1 to 4 seconds.

18. The process of claim 1, wherein the first catalyst comprises a mixture of 10 to 75 weight percent of a rare earth metal modified USY and 10 to 90 weight percent of a ZSM-5 zeolite.

19. The process of claim 1, wherein the second catalytic cracking unit is operated at a temperature between 50° and 650° C., a catalyst to feed weight ratio of 2 to 40 and a residence time of 0.1 to 4 seconds.

20. The process of claim 1, wherein the second catalyst comprises a mixture of 20 to 80 weight percent of a rare earth metal modified USY and 20 to 80 weight percent of a ZSM-5 zeolite.

* * * * *